United States Patent
Davidsson et al.

(10) Patent No.: US 10,264,402 B2
(45) Date of Patent: Apr. 16, 2019

(54) METHOD AND SYSTEM FOR SELECTIVELY ENABLING A USER DEVICE ON THE MOVE TO UTILIZE DIGITAL CONTENT ASSOCIATED WITH ENTITIES AHEAD

(71) Applicant: Volvo Car Corporation, Gothenburg (SE)

(72) Inventors: Staffan Davidsson, Vastra Frolunda (SE); Magnus Ronnang, Vastra Frolunda (SE)

(73) Assignee: VOLVO CAR CORPORATION, Gothenburg (SE)

( * ) Notice: Subject to any disclaimer, the term of this patent is extended or adjusted under 35 U.S.C. 154(b) by 0 days.

(21) Appl. No.: 15/472,607

(22) Filed: Mar. 29, 2017

(65) Prior Publication Data

US 2017/0311130 A1 Oct. 26, 2017

(30) Foreign Application Priority Data

Apr. 26, 2016 (EP) .................................. 16167097

(51) Int. Cl.
*H04W 4/02* (2018.01)
*G01C 21/36* (2006.01)
(Continued)

(52) U.S. Cl.
CPC .......... *H04W 4/029* (2018.02); *G01C 21/367* (2013.01); *G01C 21/3661* (2013.01);
(Continued)

(58) Field of Classification Search
CPC ..... H04W 4/028; H04W 4/046; H04W 4/021; H04W 4/023; H04W 4/027; H04W 4/02; H04W 4/04; G01C 21/3685; G01C 21/3697; G01C 21/3661; G01C 21/3682; G01C 21/3667; G01C 21/36; G01S 19/42
See application file for complete search history.

(56) References Cited

U.S. PATENT DOCUMENTS

| 6,401,034 B1 | 6/2002 | Kaplan et al. |
| 8,838,382 B2 | 9/2014 | Drysdale |

(Continued)

FOREIGN PATENT DOCUMENTS

| GB | 2525732 A | 11/2015 |
| WO | 2009/121299 A1 | 10/2009 |
| WO | 2010111833 A | 10/2010 |

Primary Examiner — Khawar Iqbal
(74) Attorney, Agent, or Firm — Snyder, Clark, Lesch & Chung, LLP

(57) ABSTRACT

The present disclosure relates to a method performed by a content selection system and a user device including at least a portion of the content selection system for selectively enabling a user device on the move to utilize digital content associated with one or more entities located ahead of the user device. The system determines a current position and travel direction of the user device and derives foresight conditions input including time availability indicating parameter(s). The system defines a geographical limiting zone extending in front of the user device, based on the position, travel direction, and a first time availability indicating parameter of the foresight conditions input. The system compares the limiting zone to a first stored geographical location of at least a first entity, and enables content associated with the first entity to be utilized by the user device, when the first location is within the limiting zone.

7 Claims, 8 Drawing Sheets

(51) Int. Cl.

| | | |
|---|---|---|
| *H04W 4/029* | (2018.01) | |
| *H04W 4/021* | (2018.01) | |
| *H04W 4/18* | (2009.01) | |
| *H04W 4/40* | (2018.01) | |
| *G06F 16/904* | (2019.01) | |
| *G06F 16/29* | (2019.01) | |
| *G06F 16/9537* | (2019.01) | |
| *G01S 19/42* | (2010.01) | |

(52) U.S. Cl.
CPC ..... *G01C 21/3667* (2013.01); *G01C 21/3679* (2013.01); *G01C 21/3682* (2013.01); *G01C 21/3685* (2013.01); *G01C 21/3697* (2013.01); *G06F 16/29* (2019.01); *G06F 16/904* (2019.01); *G06F 16/9537* (2019.01); *H04W 4/022* (2013.01); *H04W 4/023* (2013.01); *H04W 4/026* (2013.01); *H04W 4/027* (2013.01); *H04W 4/185* (2013.01); *H04W 4/40* (2018.02); *G01S 19/42* (2013.01)

(56) References Cited

U.S. PATENT DOCUMENTS

| | | | |
|---|---|---|---|
| 9,453,734 B2* | 9/2016 | Pylappan | G01C 21/26 |
| 2010/0248746 A1 | 9/2010 | Saavedra et al. | |
| 2011/0078238 A1* | 3/2011 | Sakka | H04L 67/18 709/203 |
| 2011/0079238 A1 | 4/2011 | Takehana | |
| 2011/0173229 A1 | 7/2011 | Choudhury et al. | |
| 2013/0215009 A1* | 8/2013 | Fukumoto | G09G 5/37 345/156 |
| 2014/0136100 A1* | 5/2014 | Drysdale | G01C 21/3679 701/461 |
| 2015/0141042 A1* | 5/2015 | Takahashi | G01S 19/42 455/456.1 |
| 2015/0142305 A1* | 5/2015 | Kubo | G09B 29/106 701/439 |
| 2015/0198457 A1* | 7/2015 | Nagy | G08G 1/09626 701/431 |
| 2015/0226566 A1 | 8/2015 | North et al. | |
| 2015/0377633 A1* | 12/2015 | Yahata | G01C 21/30 701/431 |
| 2016/0042484 A1* | 2/2016 | Osann, Jr. | H04M 1/67 455/456.3 |
| 2016/0170487 A1* | 6/2016 | Saisho | G01C 21/3635 345/156 |
| 2017/0010128 A1* | 1/2017 | Le Grand | H04W 4/029 |
| 2017/0032197 A1* | 2/2017 | Sim | B60R 1/00 |
| 2017/0176210 A1* | 6/2017 | Jones | G01C 21/3476 |
| 2018/0045516 A1* | 2/2018 | Sumizawa | G01C 21/28 |
| 2018/0342033 A1* | 11/2018 | Kislovskiy | G06Q 50/30 |

* cited by examiner

| 6 Entity | 601 Location | 41 Content | |
|---|---|---|---|
| | | POI data | Media content |
| 61 | 611 | 411,4111 | 411,4112 |
| 62 | 621 | 412,4121 | 412,4122 |
| ... | ... | ... | ... |
| n | $x_n, y_n$ | nth POI data | nth piece of media content |

40 Data table

Fig. 6

METHOD AND SYSTEM FOR SELECTIVELY ENABLING A USER DEVICE ON THE MOVE TO UTILIZE DIGITAL CONTENT ASSOCIATED WITH ENTITIES AHEAD

RELATED APPLICATION

This application claims priority under 35 U.S.C. § 119 based on European Patent Application No. 16167097.1, filed Apr. 26, 2016, the disclosure of which is hereby incorporated by reference herein.

TECHNICAL FIELD

The present disclosure relates to a content selection system and a method performed therein for selectively enabling a user device on the move to utilize digital content associated with one or more entities located ahead of the user device.

BACKGROUND

While driving, a vehicle driver commonly prefers, perhaps along with fellow vehicle occupants, to simultaneously be entertained, for instance by listening to the radio. The reasons for that may, for instance, relate to taking the opportunity to keep up to date with news updates and/or listening to music, and/or being kept informed of the traffic situation. As a side effect, listening to the radio may be mind-stimulating to the vehicle driver, thus assisting said driver in maintaining his or her attention to thereby drive more safely, and furthermore to enable said driver to, to greater extent, have a pleasant driving experience.

A further approach which potentially may improve the driving experience and/or may be mind-stimulating to the driver and/or fellow vehicle occupants, may be to provide entertainment in the form of information associated with an entity such as a landmark, area of interest, point of interest, attraction, region or the like, in the vicinity of—or lying ahead of —the vehicle. U.S. Pat. No. 8,838,382, for instance, enables automated tour guides and other computerized position based devices—such as e.g. Smartphones and GPS equipped vehicle devices—to play back tour guide audio narration and other media based, at least in part, on the user's geographic position or position history.

However, although U.S. Pat. No. 8,838,382 enables sophisticated tour guide functionality—by enabling content such as tour guide audio, text, graphic and URL associated with entities in the vicinity of a location tracking user device to be provided to said user device in an efficient manner—there is still room for improvements regarding which content is provided to the user device.

SUMMARY OF THE INVENTION

Embodiments described herein enable a user device on the move to utilize digital content only of those entities ahead which currently are considered relevant.

According to a first aspect of embodiments described herein, a method is performed by a content selection system for selectively enabling a user device on the move to utilize digital content associated with one or more entities located ahead of the user device. The content selection system determines a current position and a current travel direction of the user device. Furthermore, the content selection system derives foresight conditions input comprising one or more time availability indicating parameters. The content selection system further defines a geographical limiting zone extending in front of the user device, based on the current position, the current travel direction, and at least a first time availability indicating parameter of the foresight conditions input. Moreover, the content selection system compares the limiting zone to a first digitally stored geographical location of at least a first entity. The content selection system further enables a first piece of content associated with the first entity to be utilized by the user device, when the first location is within the limiting zone.

Thereby, there is introduced an approach according to which only adequate digital content is allowed to be utilized in and/or by a user device in motion. That is, since a current position and a current travel direction of the user device is determined, a prevailing estimated location of the user device is established, as well as a prevailing estimated direction of travel thereof. Moreover, since foresight conditions input comprising one or more time availability indicating parameters is derived, conditions indicating availability of time and/or foresight or future conditions is obtained. Since further a geographical limiting zone extending in front of the user device is defined, based on the position, the travel direction, and at least a first time availability indicating parameter of the foresight conditions input, an imaginary restricting area extending ahead of the user device is calculated in view of one or more parameters of the foresight conditions input and the position and travel direction of the user device. Moreover, since the limiting zone is compared to a first digitally stored geographical location of at least a first entity, the positions of one or more entities are considered in view of the determined limiting zone. Furthermore, since a first piece of digital content associated with the first entity is enabled to be utilized by the user device, when the first location is within the limiting zone, digital content of the first entity is not made available to the user device until the geographical location of the first entity is determined—by the previous comparing action—to fall within the limiting zone. Accordingly, only digital content of entities determined to have—or to have had—geographical locations within the limiting zone, is enabled to be utilized—e.g. presented—by the user device. Thereby, a filter mechanism is introduced, according to which digital content of entities determined to have geographical locations beyond the limiting zone, is prevented from being utilized by the user device. Accordingly, rather than allowing digital content of a potentially extensive amount of entities to be made available to the user device, merely digital content of a filtered amount of entities—which given the current circumstance—is enabled to be utilized by the user device. Thus, the user device—and subsequently the user thereof, e.g. an occupant of a vehicle on-board which the user device is carried—may be prevented from utilizing, e.g. being presented, digital content associated with potentially irrelevant entities given the current circumstances, i.e. given the one or more time availability indicating parameters.

For that reason, an approach is provided which enables a user device on the move to utilize digital content only of those entities ahead which are considered relevant. The technical features and corresponding advantages of the above mentioned method will be discussed in further detail in the following.

By introducing a method performed by a content selection system for selectively enabling a user device on the move to utilize digital content associated with one or more entities located ahead of the user device, an approach is provided which assists in allowing only relevant, adequate and/or filtered content to be presented in and/or by a user device in motion. The "content selection system" may at least partly be implemented in one or several servers and/or in one or several clouds, which furthermore may be adapted to communicate, e.g. wirelessly, with the user device and/or a vehicle on-board which the user device may be carried. Such a communication may for instance take place directly with the user device and/or said vehicle, and/or via an intermediate system adapted to wirelessly communicate with vehicles, remotely control functionality of the vehicles, and/or hold updated positions and/or information associated with the vehicles; for instance a management and/or assisting system such as e.g. Volvo On Call. Additionally or alternatively, the content selection system may at least partly be implemented in the user device itself "User device" may for instance refer to a mobile user device, which mobile user device further may have navigating abilities. The "user device" may accordingly refer to, for instance, a multi-functional smart phone, mobile phone, mobile terminal or wireless terminal, portable computer such as a laptop, PDA or tablet computer, tablet such as an iPad, Pocket PC, and/or mobile navigation device. Furthermore, the "user device"—and/or a vehicle on which the user device may be carried—may be adapted to have online abilities, for instance by supporting Wifi functionality, or by being adapted to be in radio communication with a radio communications network, such as cellular communications network, e.g. LTE, EDGE, CDMA, 4G, 3G, GPRS, or GSM, and/or an equivalent or successor thereof. Moreover, the "user device" may comprise resources such as speaker(s) commonly utilized to present audio, and/or one or several displays commonly utilized to display e.g. graphic, video, digital images, animations and/or text etc.

The expression of "a user device on the move" may refer to a "moving user device", "horizontally moving user device", "user device in horizontal motion", "user device moving in parallel to the ground" and/or "travelling user device". It should however be noted that according to an example, the user device need not necessarily be constantly on the move. This method may namely according to said example be conducted during a period when a user device is not moving, for example when a user is sitting or standing still for a period of time, or when a vehicle is parked or stuck in a traffic jam. Moreover, "user device on the move" may according to an example refer to "user device on-board a vehicle", where "vehicle" may be represented by any arbitrary vehicle, for instance an engine-propelled vehicle such as car, truck, lorry, van, bus, motor cycle, scooter, tractor, military vehicle, vessel, boat etc., a rail-bound vehicle, such as e.g. a train or tram, or a bicycle. The vehicle may further comprise, or have on-board, a commonly known positioning system, such as a global positioning system, navigation system or the like. Moreover, the "user device" may be adapted to communicate with the vehicle on which it may be carried. The expression of the user device being adapted to "communicate with the vehicle", may refer to the user device being configured to be in communication with the vehicle, e.g. the in-vehicle system thereof, such that information and/or data may be transferred between the vehicle and the user device. Such communication may for instance be accomplished physically, such as via USB connection, and/or wirelessly, such as via Bluetooth, WiFi, or the like; additionally or alternatively, the connection may be accomplished via the intermediate system discussed above and/or one or more clouds. Said expression may further refer to the user device being adapted to be "paired" and/or adapted to "be in connection" with the vehicle. The "user device" may in that context be referred to as a "nomadic device". Possibly, in order to be paired, identification of the nomadic device may be necessary, and/or authentication of the vehicle occupant, e.g. the driver. While the nomadic device is paired, a vehicle occupant may utilize functionality provided by the content selection system to the nomadic device, via the in-vehicle system. Accordingly, resources such as one or more loud speakers and/or displays of the in-vehicle system may be utilized to e.g. present said functionality provided by the content selection system. Additionally or alternatively, the "user device" may be comprised in and/or integrated with the vehicle, whereby the user device subsequently may refer to an in-vehicle system or infotainment system of said vehicle.

"Digital content" may for instance refer to "digitally stored content", "digital data", "digital media", "data content", "data record", "media file", "media content", "audio media file", "Point of Interest data", and/or "Point of Interest icon", and may further refer to arbitrary digital information such as audio, text, graphic, video, URL, TTS (Text to Speech) etc. which the user device is able to receive and/or store, and which the user device subsequently may be able to utilize, e.g. present. "Digital content" may furthermore, according to an example, refer to "filtered digital content", "adequate digital content" and/or "relevant digital content". The "digital content" may be obtained from computer memory either stored e.g. in the user device's memory and/or external or remote data sources, such as in one or more clouds and/or one or more servers, e.g. an audio media server. Moreover, "entity" may in this context refer to any arbitrary physical entity such as a "geographical location", "landmark," "point of interest", "area of interest", "place of interest", "region of interest", "business or municipal operation or organisation" etc., such as for instance a tourist attraction. Accordingly, the expression "digital content associated with one or more entities" may refer to one or more pieces of content associated with respective entity, such as e.g. digitally stored curiosa and/or information related to the exemplifying tourist attraction. Furthermore, digital content "associated with" one or more entities, may refer to digital content "tagged with", "related to", "linked with", "labelled to be associated with", and/or "categorized to be associated with" one or more entities. Entities "located" ahead of the user device may refer to entities "positioned" and/or "with geographical locations" ahead of the user device, whereas entities located "ahead" of the user device, may refer to entities located "further ahead", "in a direction of travel", "in a direction of a road of travel" and/or "in the vicinity" of the user device. Moreover, the expression "selectively enabling" may refer to "adequately enabling", "in an adequate manner enabling", and/or "in a filtered manner enabling", whereas "enabling a user device on the move to utilize digital content" may refer to "providing a user device on the move with digital content", "outputting to a user device on the move digital content", "allowing a user device on the move to utilize digital content" and/or "enabling a user device on the move to present digital content".

Since the content selection system determines a current position and a current travel direction of the user device, a prevailing estimated location of the user device is established, as well as a prevailing estimated direction of travel thereof. The current position—which for instance may be based on global coordinates, based on a longitudinal positioning along e.g. a road, and/or based on a relative position—may, at least partly, be determined in any arbitrary manner, for instance with support from commonly known positioning techniques, such as global positioning techniques, and/or sensor techniques commonly provided. The current position may thus be established for instance by utilizing GPS position data and geographic map data such as provided by map data suppliers, commonly known Google maps, Apple maps and/or equivalents or successors thereof. Additionally or alternatively, other methods—such as e.g. triangulation—may be utilized. The current travel direction may be determined in a similar manner, for instance taking into account one or more previous determined or known positions of the user device. Moreover, the current position and/or current travel direction may be determined by functionality of the user device itself and/or for instance by functionality of a vehicle on-board which the user device may be carried, and subsequently be derived by—and/or provided to—the content selection system. Additionally or alternatively, the current position and/or the current travel direction may be derived from the intermediate system discussed above. Thus, the current position and/or current travel direction may be derived at a current instant in time; additionally and/or alternatively, a stored position value and/or stored travel direction value may be derived, e.g. from a database holding vehicle position values and/or vehicle travel direction values, which database for instance may be comprised in said intermediate system. "Current" may in this context refer to "essentially current" and/or "prevailing", whereas the expression "determining" a current position and a current travel direction, may refer to "deriving", "calculating", "accessing", "obtaining", "reading", "requesting", "receiving", "requesting and receiving", and/or "fetching" a current position and a current travel direction. Moreover, "position" may refer to "geographical position", "horizontal position", "estimated position", and/or "approximate position", whereas "travel direction" may refer to "horizontal travel direction", "travel direction parallel to the ground", "estimated travel direction", and/or "approximate travel direction". Furthermore, the expression "current position" may, for instance, refer to "prevailing position", "position at a current or prevailing point of time", and/or "position at an essentially current or essentially prevailing point of time", whereas "current travel direction" for instance may refer to "prevailing travel direction", "travel direction at a current or prevailing point of time", and/or "travel direction at an essentially current or essentially prevailing point of time". According to an example, the expression "determining a current position and a current travel direction of the user device", may refer to "determining a current position and a current travel direction of the vehicle".

Since the content selection system derives foresight conditions input comprising one or more time availability indicating parameters, conditions indicating availability of time and/or foresight or future conditions is obtained. That is, said one or more time availability indicating parameters—and subsequently the foresight conditions input—reflect parameters affecting the availability of time for the moving user device, i.e. how much time the user device on the move may have in store. The foresight conditions input may be obtained from computer memory either stored e.g. in the user device's memory and/or external data sources, such as in one or more clouds and/or one or more servers e.g. holding map data, and/or from e.g. a navigation system associated with the user device or a vehicle on-board which the user device is carried. The expression "foresight conditions input" may refer to "time availability indicating input", "time availability affecting input" and/or "priming input", whereas "input" for instance may refer to "data", "value(s)" and/or "information". Moreover, deriving "foresight conditions input" may refer to deriving "digital foresight conditions input", whereas "deriving" foresight conditions input may refer to "accessing", "obtaining", "reading", "requesting", "receiving", "requesting and receiving", "fetching", "calculating", "defining", "estimating" and/or "determining" foresight conditions input. Furthermore, "time availability indicating parameters" may refer to "time related parameters", "time availability affecting parameters" and/or "time availability restricting parameters", and may further refer to "pieces of time availability indicating data".

Since the content selection system defines a geographical limiting zone extending in front of the user device, based on the position, the travel direction, and at least a first time availability indicating parameter of the foresight conditions input, an imaginary restricting area extending ahead of the user device is calculated in view of one or more parameters of the foresight conditions input and the position and travel direction of the user device. The geographical limiting zone may be of any arbitrary shape or size given the restrictions pertinent the position, travel direction and at least first time availability indicating parameter, and the calculation(s) behind defining the geographical limiting zone may vary. An extension of the limiting zone may for instance range from a few tens of meters up to hundreds of kilometers, depending on the restricting foresight conditions input. Similarly, a maximum width of the limiting zone may for instance range from a few tens of meters up to tens of kilometers, depending on said restricting foresight conditions input. "Defining" a geographical limiting zone may refer to "determining" and/or "calculating" a geographical limiting zone, whereas "zone" may refer to "area", "region", "polygon" and/or "sector". Moreover, "geographical limiting zone" may refer to "fictive, hypothetical and/or imaginary geographical limiting zone", whereas "based on" in this context may refer to "taking into consideration", "in view of", "utilizing", "calculated based on" and/or "by calculation using as input". Furthermore, the expression of a limiting zone "extending" in front of the user device, may refer to a limiting zone "located" and/or "positioned" in front of the user device. Moreover, a limiting zone "extending in front of the user device", may refer to a limiting zone "extending in the travel direction of the user device", "extending in a direction of a road along which the user device is determined to move", and/or "originating in the determined user device position and extending in front of the user device".

According to an example, "extending in front of the user device", may refer to "extending in front of the user device, said geographical limiting zone originating a distance ahead of the determined user device position". Thereby, in the exemplifying scenario, the limiting zone—rather than originating for instance in the determined user device position—the limiting zone originates further ahead in front of the user device, e.g. further ahead in the travel direction of the user device and/or in a direction of a road along which the user device is determined to move. A length of such a distance may be arbitrary and depend on the foresight conditions input; for instance be represented by a length of a few meters up to several kilometers.

Since the content selection system compares the limiting zone to a first digitally stored geographical location of at least a first entity, the positions of one or more entities are considered in view of the determined limiting zone. Which entities are selected for comparison may be arbitrarily selected; for instance are entities selected which are considered or determined to be within a region in a forward view of —or surrounding—the user device. An extension and/or width of such a region may for instance range from a few meters up to hundreds of kilometers, depending on the implementation and/or conditions at hand, e.g. memory capacity. "Comparing" the limiting zone may refer to "comparing one or more boundary values of", and/or "considering in view of" the limiting zone. Moreover, the expression "digitally stored geographical location", may refer to "geographical location stored in digital data and/or digital map data", "digitally specified geographical location" and/or "digitally stored geographical position". Furthermore, location "of" at least a first entity, may refer to location "associated with", "tagged with", "related to", "linked with", "labelled to be associated with" and/or "categorized to be associated with" at least a first entity. The digitally stored geographical locations of the one or more entities may for instance reside in memory, such as commonly known in map data of a map data database, for instance in the user device's memory and/or in one or more external and/or remote data sources, such as in one or more clouds and/or one or more servers.

Since the content selection system enables a first piece of digital content associated with the first entity to be utilized by the user device, when the first location is within the limiting zone, digital content of the first entity is not made available to the user device until the geographical location of the first entity is determined—by the previous comparing action—to fall within the limiting zone. Accordingly, only digital content of entities determined to have—or to have had—geographical locations within the limiting zone, is enabled to be utilized—e.g. presented—by the user device. Thereby, a filter mechanism is introduced, according to which digital content of entities determined to have geographical locations beyond the limiting zone, is prevented from being utilized by the user device. Accordingly, rather than allowing digital content of a potentially extensive amount of entities to be made available to the user device, merely digital content of a filtered amount of entities— which given the current circumstance—is enabled to be utilized by the user device. Thus, the user device—and subsequently the user thereof, e.g. an occupant of a vehicle on-board which the user device is carried—may be prevented from utilizing, e.g. being presented, digital content associated with potentially irrelevant entities given the current circumstances, i.e. given the one or more time availability indicating parameters.

As a result of that the time availability parameters may be dynamic, the limiting zone may thus change dynamically. That is, since the limiting zone varies with the one or more time availability indicating parameters, said limiting zone may range from being relatively limited to being relatively extensive. Thus, entities being determined to have geographical locations beyond a first limiting zone given a first set of time availability parameters, may be determined to have geographical locations which fall within an alternative limiting zone given an alternative set of time availability parameters. Accordingly, a limiting zone applicable for a user device being carried by e.g. a pedestrian, may be significantly more limited than a limiting zone applicable for a user device on-board a vehicle travelling along a highway. In the former scenario, the pedestrian may be interested in digital content of entities in close vicinity thereof rather than digital content of entities lying further ahead, and an extension and/or width of the limiting zone may thus be defined to be relatively limited, and/or the limiting zone furthermore defined to originate in the determined user device position. On the contrary, in the latter scenario, the vehicle occupant may be interested in digital content of entities lying further ahead and/or entities lying relatively far away from a road along which the vehicle may be travelling, and the limiting zone may thus be defined to be relatively extensive and/or relatively wide. Moreover, in the latter scenario, digital content of entities lying in close vicinity of the determined user device position may be considered to be too close to said position and accordingly the digital content associated therewith irrelevant, whereby the limiting zone additionally or alternatively may be defined to originate further ahead of the user device, such that geographical locations of those entities in close vicinity fall beyond the limiting zone and subsequently are prevented from being made available to the user device. The expression "enabling" a first piece of content, may refer to "providing", "allowing", "making available", "submitting", "supplying", "sending", "pushing" and/or "streaming" a first piece of content, whereas "to be utilized by" may refer to "to be stored by", "to be presented by", "to be used by" and/or "to be received by". Moreover, a first piece of content "associated with" the first entity, may refer to a first piece of content "tagged with", "related to", "linked with", "labelled to be associated with" and/or "categorized to be associated with" the first entity. Furthermore, "when" may in this context refer to "if" and/or "only when", whereas the expression "is within" the limiting zone may refer to "once has come within", "falls within", "is within or on a boundary of" and/or "reaches" the limiting zone.

Optionally, the one or more time availability indicating parameters may comprise a current travel speed of the user device. Thereby, the limiting zone is defined taking into account at least the travel speed of the user device, and the limiting zone may accordingly vary essentially therewith, potentially with a delay. In order to provide an adequate filter mechanism, the limiting zone may for instance be defined to have a relatively limited extension should the travel speed be relatively slow, and to have a relatively extensive extension should the travel speed be relatively high. Moreover, should the limiting zone optionally be defined to originate a distance ahead of the determined user device position, then said distance may for instance be defined to be relatively short in the former scenario as compared to the latter, since in the latter scenario, there would be less time available before reaching entities in close vicinity, whereby digital content of these entities may be considered irrelevant and consequently the geographical locations of these entities preferred to fall outside the limiting zone. The travel speed of the user device may be determined as commonly known in the art, and further for instance be derived from functionality of the user device and/or from a vehicle on-board which the user device is carried. According to an example, the "travel speed of the user device" may refer to the "travel speed of the vehicle on-board which the user device is carried". The expression "current" travel speed may refer to "essentially current", "prevailing", "current approximate" travel speed. Moreover, "current travel speed" may refer to "travel speed at a current or prevailing point of time", and/or "travel speed at an essentially current or essentially prevailing point of time".

Additionally or alternatively, the one or more time availability indicating parameters may comprise a speed limit of a road along which the user device is determined to move and/or a presumed upcoming road. Thereby, the limiting zone is defined taking into account at least said speed limit, and the limiting zone may accordingly vary essentially therewith, potentially with a delay. In order to provide an adequate filter mechanism, the limiting zone may for instance be defined to have a relatively limited extension should said speed limit be relatively slow, and to have a relatively extensive extension should said speed limit be relatively high. Moreover, should the limiting zone optionally be defined to originate a distance ahead of the determined user device position, then said distance may for instance be defined to be relatively short in the former scenario as compared to the latter, since in the latter scenario, there would be less time available before reaching entities in close vicinity, whereby digital content of these entities may be considered irrelevant and consequently the geographical locations of these entities preferred to fall outside the limiting zone. Said "speed limit" and/or said "road along which the user device is determined to move and/or a presumed upcoming road" may be determined—and subsequently derived—as commonly known in the art, for instance from and/or based on previously discussed map data and/or map data suppliers. The "presumed upcoming road" may be determined in any arbitrary known manner, for instance based on a specified and/or predetermined route, a road commonly travelled by the user device, and/or a road frequently used by other user devices and/or vehicles. The expression "determined" to move may refer to "estimated" and/or "calculated" to move, whereas "to move" may refer to "to travel", "to move in parallel to the ground" and/or "to horizontally move".

Additionally or alternatively, the one or more time availability indicating parameters may comprise an estimated time to a specified destination for the user device. Thereby, the limiting zone is defined taking into account at least said estimated time, and the limiting zone may accordingly vary with varying estimated times. In order to provide an adequate filter mechanism, the limiting zone may for instance be defined to have a relatively limited extension and/or maximum width should said estimated time be relatively short, and a relatively extensive extension and/or maximum width should said estimated time be relatively long. Said "estimated time to a specified destination" may be determined—and subsequently derived—as commonly known in the art, for instance from and/or based on previously discussed navigation system, map data and/or map data suppliers. The "specified destination" may for instance refer to a destination—e.g. a final destination—specified and/or predetermined in the navigation system, whereas "estimated time" may refer to "estimated remaining time".

Additionally or alternatively, the one or more time availability indicating parameters may comprise a restricting time pertinent an upcoming planned activity specified in a calendar associated with the user device. Thereby, the limiting zone is defined taking into account at least said restricting time, and the limiting zone may accordingly vary with varying restricting times. In order to provide an adequate filter mechanism, the limiting zone may for instance be defined to have a relatively limited extension and/or maximum width should said restricting time be within relatively shortly, and to have a relatively extensive extension and/or maximum width should said restricting time be relatively later in time. The expression "restricting time pertinent an upcoming planned activity" may for instance refer to a limiting point of time at which a planned activity—such as a meeting—is due, whereas "specified in a calendar" may refer to "derived from, noted in, added to and/or entered in a digital calendar". Moreover, "calendar associated with" the user device may refer to "calendar electronically associated with, linked with, related to, accessible from, comprised in and/or synchronising with" the user device.

Additionally or alternatively, the one or more parameters may comprise a type of carrier on which the user device is carried. Thereby, the limiting zone is defined taking into account at least the type of carrier on which the user device is carried, and the limiting zone may accordingly vary with different types thereof. The carrier may refer to any arbitrary carrier able to bring the user device in horizontal motion, for instance a human being and/or vehicle. In order to provide an adequate filter mechanism, the limiting zone may for instance be defined to have a relatively limited extension should the type of carrier be a slow moving carrier such as e.g. a pedestrian, bicycle or commonly known Segway, and to have a relatively extensive extension should the type of carrier be a potentially fast moving carrier such as e.g. a potentially fast moving vehicle, for instance a passenger car. Moreover, should the limiting zone optionally be defined to originate a distance ahead of the determined user device position, then said distance may for instance be defined to be relatively short in the former scenario as compared to the latter, since in the latter scenario, there would be less time available before reaching entities in close vicinity, whereby digital content of these entities may be considered irrelevant and consequently the geographical locations of these entities preferred to fall outside the limiting zone. The type of carrier on which the user device is carried may be determined in any arbitrary manner, for instance by detecting a horizontal motion behaviour of the user device and subsequently determining and/or estimating said carrier. Additionally or alternatively, the type of carrier may be specified—for instance by a user of said user device—and subsequently be derived by the content selection system.

Optionally, the digital content may comprise media content and said first piece of digital content comprise a first piece of media content associated with the first entity. Thereby, media content of one or more entities may be enabled to be utilized by the user device, when geographical locations of said entities are within the limiting zone. Accordingly, media content—such as e.g. curiosa, information and/or facts in audio, text, video, URL etc. format—associated with those entities located within the limiting zone, may be made available for use by the user device, for instance for audible and/or visual presentation thereof. Thus, should the first entity be represented by the exemplifying tourist attraction, and the first piece of media content be represented by parking guidance for parking in the vicinity of said tourist attraction, then said parking guidance would be enabled for utilization—e.g. presentation—by the user device, when the geographical location of the tourist attraction falls within the limiting zone.

Optionally, the digital content may comprise Point of Interest, POI, data and the first piece of digital content comprise first POI data associated with the first entity. The content selection system enabling the first piece of digital content to be utilized by the user device then comprises enabling—for instance displaying—at least a portion of the first POI data on a digital map on a display of the user device. Thereby, POI data of one or more entities may be enabled to be e.g. displayed by the user device, when geographical locations of said entities are within the limiting zone. Accordingly, at least a portion of POI data—such as e.g. POI icons in digital format—associated with those entities located within the limiting zone, may be made available for utilization e.g. visualized on a digital map on a display of the user device. Thus, should the first entity be represented by the exemplifying tourist attraction, and the first POI data comprise at least a POI icon, then said POI icon would be enabled for display by the user device, when the geographical location of the tourist attraction falls within the limiting zone. "Point of Interest data" is intended to refer to Point of Interest data as commonly known in the art, which POI data for instance may be comprised in the previously discussed map data. Moreover, POI data "associated with" the first entity may refer to POI data "tagged with", "related to", "linked with", "labelled to be associated with" and/or "categorized to be associated with" the first entity. The expression of enabling "at least a portion" of the first POI data, may refer to enabling "one or more pieces of data" and/or "at least a POI icon", whereas "enabling" may refer to "enabling displaying", "enabling presenting" and/or "making available". "Display" may refer to "at least a first display", "digital display" and/or "head-up display". Furthermore, the expression "digital map", onto which POI icons of entities may be mapped, may refer to a digital map comprising digital map data, as commonly known in the art. The digital map and/or the digital map data thereof may for instance be stored at any arbitrary location accessible by the content selection system and/or user device, and for instance be supported by previously discussed map data suppliers.

Optionally, the limiting zone may be defined such that an imaginary plotted view thereof is represented by a sector extending in front of the user device enclosed by a first radius and a second radius of a circle. An angle of the sector and/or a length of said radii is then based on the at least first time availability indicating parameter of the foresight conditions input. Thereby, the limiting zone is represented by a fictive circle sector restricted by the determined position and travel direction of the user device as well as one or more time availability indicating parameters. Accordingly, a feasible and efficient approach is presented with regards to how to define the limiting zone. The length of the radii may take on any arbitrary feasible value considered appropriate given the current circumstances, and may for instance range from a few tents of meters up to hundreds of kilometers depending on the at least first time availability indicating parameter. The "length" of the radii may refer to the previously discussed "extension" of the limiting zone. Similarly, the angle of the sector may take on any arbitrary feasible value considered appropriate given the current circumstance, and may range for instance from a few degrees up to 180 degrees depending on the at least first time availability indicating parameter. Said angle may even, according to an example, range up to close to 360 degrees, for instance should a determined travel speed of the user device be essentially equal to—or close to—zero. The expression "imaginary" plotted view may refer to "fictive" and/or "hypothetical" plotted view, whereas "plotted view" may refer to "projection". Moreover, "based on" may in this context refer to "takes into consideration", "utilizes", "calculated based on" and/or "is calculated using as input".

According to an example, the determined current user device position may represent a circle centre of said circle. Thereby, the limiting zone originates in said circle centre. According to another example, the limiting zone may further be defined such that the sector further is enclosed by an arc between the first radius and the second radius. Thereby, the arc represents a distal boundary of the limiting zone. A length of the arc may refer to the previously discussed "maximum width" of the limiting zone.

The limiting zone may be defined such that the sector is asymmetrically arranged along an elongation of a fictive line in the travel direction. Optionally, however, the limiting zone may be defined such that the sector is symmetrically arranged along an elongation of a fictive line in the travel direction. Thereby, the travel direction of the user device dictates the direction of the sector, i.e. said travel direction dictates the direction of the limiting zone, in that said sector and subsequently said limiting zone is symmetrically arranged along a hypothetical line extending in the travel direction. Additionally or alternatively, the limiting zone may be defined such that the sector is asymmetrically arranged along a section of a road along which the user device is determined to move. Optionally, however, the limiting zone may be defined such that the sector is symmetrically arranged along a section of a road along which the user device is determined to move. Thereby, the direction of the road section along which the user device is moving dictates the direction of the sector, i.e. said direction of the road section dictates the direction of the limiting zone. "Symmetrically" may refer to "essentially symmetrically", whereas "fictive" may refer to "imaginary" and/or "hypothetical". Moreover, the expression of that the sector is "symmetrically arranged along", may refer to that the sector is "arranged such that said sector and/or the angle thereof is split in two equal, or essentially equal, halves by". The expression "elongation of a fictive line" in the travel direction may refer to "a fictive line extending" in the travel direction, whereas "determined to move" may refer to "estimated to move", "determined to move in parallel to the ground" and/or "determined to horizontally move". Determination of the road section along which the user device is moving may be determined as commonly known in the art, for instance with support from previously discussed map data and/or map data suppliers.

Optionally, the limiting zone may be defined such that an imaginary view thereof further comprises at least a second sector extending in front of an estimated upcoming position of the user device further ahead along a road along which the user device is determined to move and/or a presumed upcoming road. The second sector is enclosed by a third and fourth radius of a second circle. An angle of the second sector and/or a length of said radii is based on said first time availability indicating parameter and/or at least a second time availability indicating parameter of the foresight conditions indicating input. Thereby, one or more additional sectors may filter out additional digital data of further entities having geographical locations falling within the one or more additional sectors. Since the second sector extends in front of an estimated upcoming position of the user device, which upcoming position may be arbitrarily selected, said second sector may, according to an example, at least partly overlap with—and/or follow upon—the first sector. Moreover, since an angle of the second sector and/or a length of the radii of the second sector may be based on the first time availability indicating parameter and/or at least a second time availability indicating parameter, said angle and/or radii of the second sector may differ from the angle and/or radii of the first sector. Accordingly, the angle and/or radii of the first sector may for instance be based at least on the current speed of the user device, whereas the angle and/or radii of the second sector for instance may be based at least on the speed limit valid for an upcoming road along which the estimated upcoming position of the user device is presumed to be situated. "Estimated upcoming position of the user device further ahead along a road along which the user device is determined to move and/or a presumed upcoming road" may be determined—and subsequently derived—as commonly known in the art, for instance from and/or based on previously discussed map data and/or map data suppliers.

According to an example, the estimated upcoming user device position may represent a circle centre of the second circle. Thereby, the second limiting zone originates in said circle centre of the second circle.

According to a second aspect of embodiments described herein, a content selection system is adapted for selectively enabling a user device on the move to utilize digital content associated with one or more entities located ahead of the user device. The content selection system comprises a conditions determining unit adapted for determining a current position and a current travel direction of the user device, and a time availability deriving unit adapted for deriving foresight conditions input comprising one or more time availability indicating parameters. The content selection system further comprises a zone defining unit adapted for defining a geographical limiting zone extending in front of the user device, based on the position, the travel direction, and at least a first time availability indicating parameter of the foresight conditions input. Moreover, the content selection system comprises a data comparing unit adapted for comparing the limiting zone to a first digitally stored geographical location of at least a first entity. The content selection system further comprises a content enabling unit adapted for enabling a first piece of digital content associated with the first entity to be utilized by the user device, when the first location is within the limiting zone.

Optionally, the one or more time availability indicating parameters may comprise a current travel speed of the user device. Additionally or alternatively, the one or more time availability indicating parameters comprises a speed limit of a road along which the user device is determined to move and/or a presumed upcoming road. Additionally or alternatively, the one or more time availability indicating parameters comprises an estimated time to a specified destination for the user device. Additionally or alternatively, the one or more time availability indicating parameters comprises a restricting time pertinent an upcoming planned activity specified in a calendar associated with the user device. Additionally or alternatively, the one or more time availability indicating parameters comprises a type of carrier on which the user device is carried.

Furthermore, optionally, the digital content may comprise media content and the first piece of digital content comprises a first piece of media content associated with the first entity. Moreover, optionally, the digital content comprises Point of Interest (POI) data and the first piece of digital content may comprise first POI data associated with the first entity. The content enabling unit is then further adapted for enabling at least a portion of the first POI data on a digital map on a display of the user device.

Optionally, the limiting zone may be defined such that an imaginary plotted view thereof is represented by a sector extending in front of the user device enclosed by a first radius and a second radius of a circle, wherein an angle of the sector and/or a length of the radii is based on the at least first time availability indicating parameter. According to an example, the limiting zone is further defined such that the sector further is enclosed by an arc between the radii. Moreover, optionally, the limiting zone may be defined such that the sector is symmetrically arranged along an elongation of a fictive line in the travel direction. Additionally or alternatively, the limiting zone is defined such that the sector is symmetrically arranged along a section of a road along which the user device is determined to move.

Optionally, the limiting zone may be defined such that an imaginary view thereof further comprises at least a second sector extending in front of an estimated upcoming position of the user device further ahead along a road along which the user device is determined to move and/or a presumed upcoming road. The second sector is then enclosed by a third and fourth radius of a second circle, wherein an angle of the second sector and/or a length of the radii is based on the first time availability indicating parameter and/or on at least a second time availability indicating parameter of the foresight conditions input.

Similar advantages as those mentioned in the foregoing in relation to the first aspect correspondingly apply to the second aspect, which is why these advantages are not further discussed.

According to a third aspect of embodiments described herein, a user device comprises at least a portion of the content selection system discussed above, i.e. comprising at least the conditions determining unit, the time availability deriving unit, the zone defining unit, the data comparing unit and/or the content enabling unit. Again, similar advantages as those mentioned in the foregoing in relation to the first aspect correspondingly apply to the third aspect, which is why these advantages are not further discussed.

According to a fourth aspect of embodiments described herein, a computer program product comprises a computer program containing computer program code means arranged to cause a computer or a processor to execute the steps of the content selection system discussed above, stored on a computer-readable medium or a carrier wave. Yet again, similar advantages as those mentioned in the foregoing in relation to the first aspect correspondingly apply to the fourth aspect, which is why these advantages are not further discussed.

BRIEF DESCRIPTION OF THE DRAWINGS

The various aspects of the non-limiting embodiments of the invention, including particular features and advantages, will be readily understood from the following detailed description and the accompanying drawings, in which:

FIG. 6 illustrates a schematic overview of an exemplifying data table according to embodiments of the disclosure;

DETAILED DESCRIPTION

Figure 1:
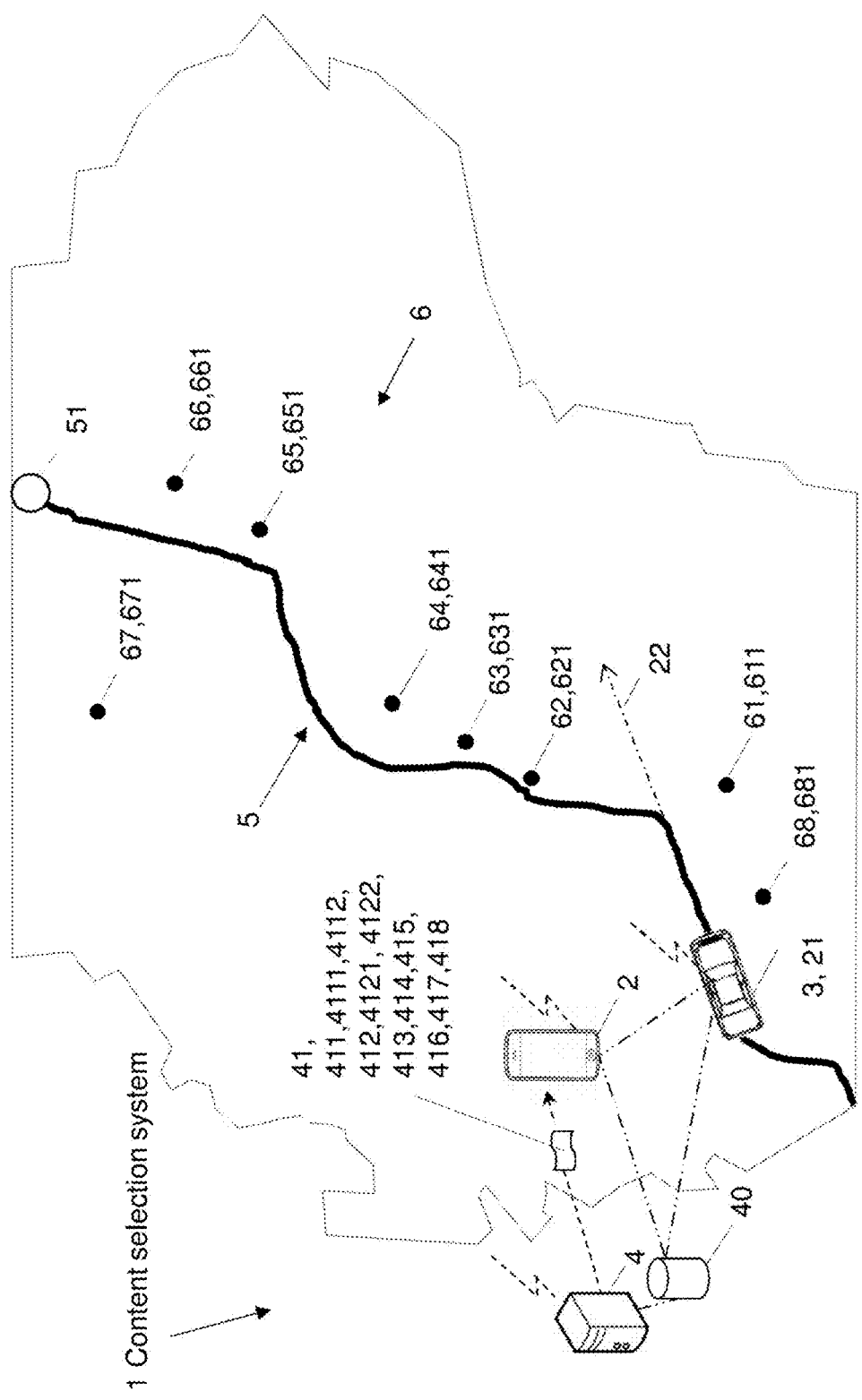
FIG. 1 illustrates a schematic overview of an exemplifying content selection system according to embodiments of the disclosure.

The non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to selectively enabling a user device on the move to utilize digital content associated with one or more entities located ahead of the user device, there will be disclosed that the inventive concept enables a user device—and subsequently a user thereof, e.g. an occupant of a vehicle on-board which the user device is carried—to be prevented from utilizing, e.g. being presented, digital content associated with potentially irrelevant entities given the current circumstances.

Referring now to the figures and FIG. 1 in particular, there is depicted a schematic overview of an exemplifying content selection system 1 according to embodiments of the disclosure. The content selection system 1, which will be described in further detail later on in this description, may at least partly be comprised in a user device 2, which in the exemplifying embodiment is carried on-board a vehicle 3. The content selection system 1 may furthermore be at least partly comprised in at least a first remote server 4 which may be adapted to communicate wirelessly with the user device 2. The vehicle 3—and subsequently the user device 2—which either or both may support navigating abilities, has a current position 21, and a current travel direction 22. The vehicle 3—and subsequently the user device 2—is travelling along an exemplifying road 5, optionally toward a specified final destination 51, along which road 5 an exemplifying plurality of entities 6 is spread out—a first entity 61 having a first geographical location 611, a second entity 62 having a second geographical location 621, a third entity 63 having a third geographical location 631, a fourth entity 64 having a fourth geographical location 641, a fifth entity 65 having a fifth geographical location 651, a sixth entity 66 having a sixth geographical location 661, a seventh entity 67 having a seventh geographical location 671 and an eighth entity 68 having an eighth geographical location 681. The first entity 61 is here represented by an exemplifying tourist attraction.

The content selection system 1, the user device 2, the vehicle 3, the one or more servers 4 and/or one or more clouds, may furthermore comprise an optional data table 40 comprising digital content 41, such as a first piece of digital content 411 associated with the first entity 61, a second piece of digital content 412 associated with the second entity 62, a third piece of digital content 413 associated with the third entity 63, a fourth piece of digital content 414 associated with the fourth entity 64, a fifth piece of digital content 415 associated with the fifth entity 65, a sixth piece of digital content 416 associated with the sixth entity 66, a seventh piece of digital content 417 associated with the seventh entity 67 and an eighth piece of digital content 418 associated with the eighth entity 68.

The digital content 41 may comprise POI data associated with respective entity 6. The first piece of digital content 411 may thus comprise first POI data 4111 associated with the first entity 61, the second piece of digital content 412 comprise second POI data 4121 associated with the second entity 62, etc. The first POI data 4111 is here represented by at least a first POI icon indicating that the first entity 61 is a tourist attraction. Additionally or alternatively, the digital content 41 may comprise media content associated with respective entity 6. The first piece of digital content 411 may thus in this latter scenario comprise a first piece of media data 4112 associated with the first entity 61, the second piece of digital content 412 comprise a second piece of media data 4122 associated with the second entity 62, etc. The first piece of media data 4112 is here represented by parking information and/or curiosa or other information associated with the exemplifying tourist attraction 61.

Figure 2:
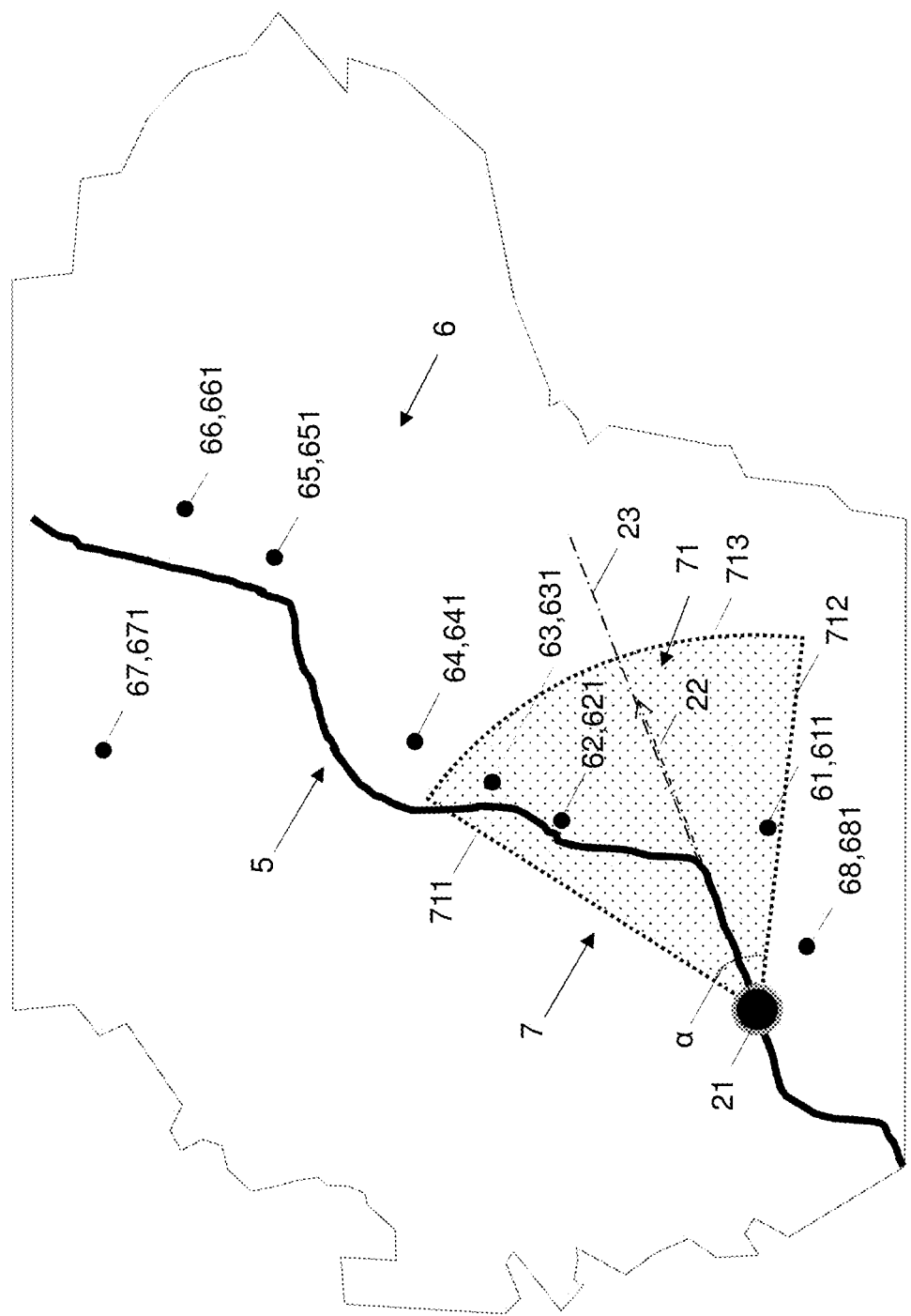
FIG. 2 illustrates a schematic overview of an exemplifying imaginary view of a limiting zone according to embodiments of the disclosure.

FIG. 2 illustrates a schematic overview of an exemplifying imaginary view of a limiting zone 7 according to embodiments of the disclosure, which may apply to the conditions of the embodiment shown of FIG. 1. The limiting zone 7 extends in front of the user device 2. In the shown embodiment of FIG. 2, the imaginary plotted view of the limiting zone 7 is represented by a sector 71 extending in front of the user device 2 enclosed by a first radius 711 and a second radius 712 of a circle, and here further an arc 713. The sector 71 has an angle α. The sector 71 may for instance be symmetrically arranged along an elongation of a fictive line or imaginary line 23 in the travel direction 22; additionally or alternatively, the sector 71 may for instance be symmetrically arranged along a section of a road 5 along which the user device 2 is determined to move. Here, the limiting zone 7—subsequently the sector 71—originates in the current user device position 21, whereby said user device position 21 represents a circle center of the sector 71. It may be noted that according to alternative embodiment, the limiting zone 7—subsequently the sector 71—may originate a distance ahead of the current user device position 21. In the shown exemplifying embodiment, the first, second and third entities 61, 62, 63 have respective geographical locations 611, 621, 631 within the limiting zone 7, whereas the fourth, fifth, sixth, seventh and eighth entity 64, 65, 66, 67, 68 have respective geographical locations 641, 651, 661, 671, 681 situated beyond the limiting zone 7.

Figure 3:
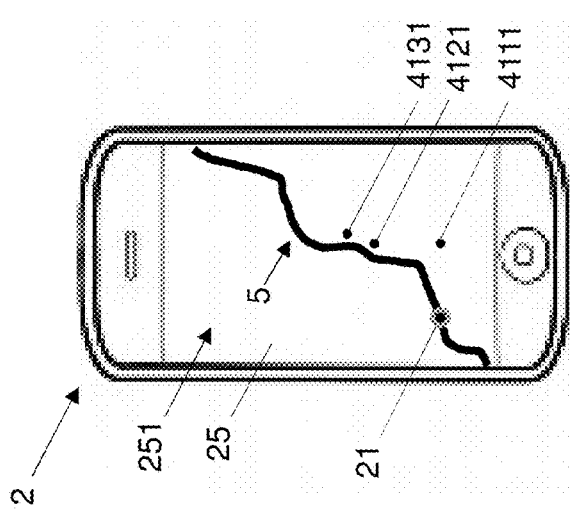
FIG. 3 illustrates a schematic overview of an exemplifying digital map view according to embodiments of the disclosure, which may result from applying the limiting zone of FIG. 2.

FIG. 3 illustrates a schematic overview of an exemplifying digital map view according to embodiments of the disclosure, which may result from applying the limiting zone 7—subsequently sector 71—of FIG. 2. The digital map view illustrates a digital map 251 on a display 25 of the user device 2. Shown on the digital map 251 is the current vehicle position 21 on the exemplifying road 5 along which the vehicle 3—and subsequently the user device 2—is travelling. The digital map 251 may further support POI data associated with entities 6, such as POI icons. Enabled, here displayed, in the exemplifying embodiment is thus—from implementing the limiting zone 7, i.e. the sector 71—the first POI data 4111 associated with the first entity 61, the second POI data 4121 associated with the second entity 62, and third POI data 4131 associated with the third entity 63. It may be noted that POI data associated with respective fourth, fifth, sixth, seventh and eighth entities 64, 65, 66, 67, 68 is not enabled/displayed.

Figure 4:
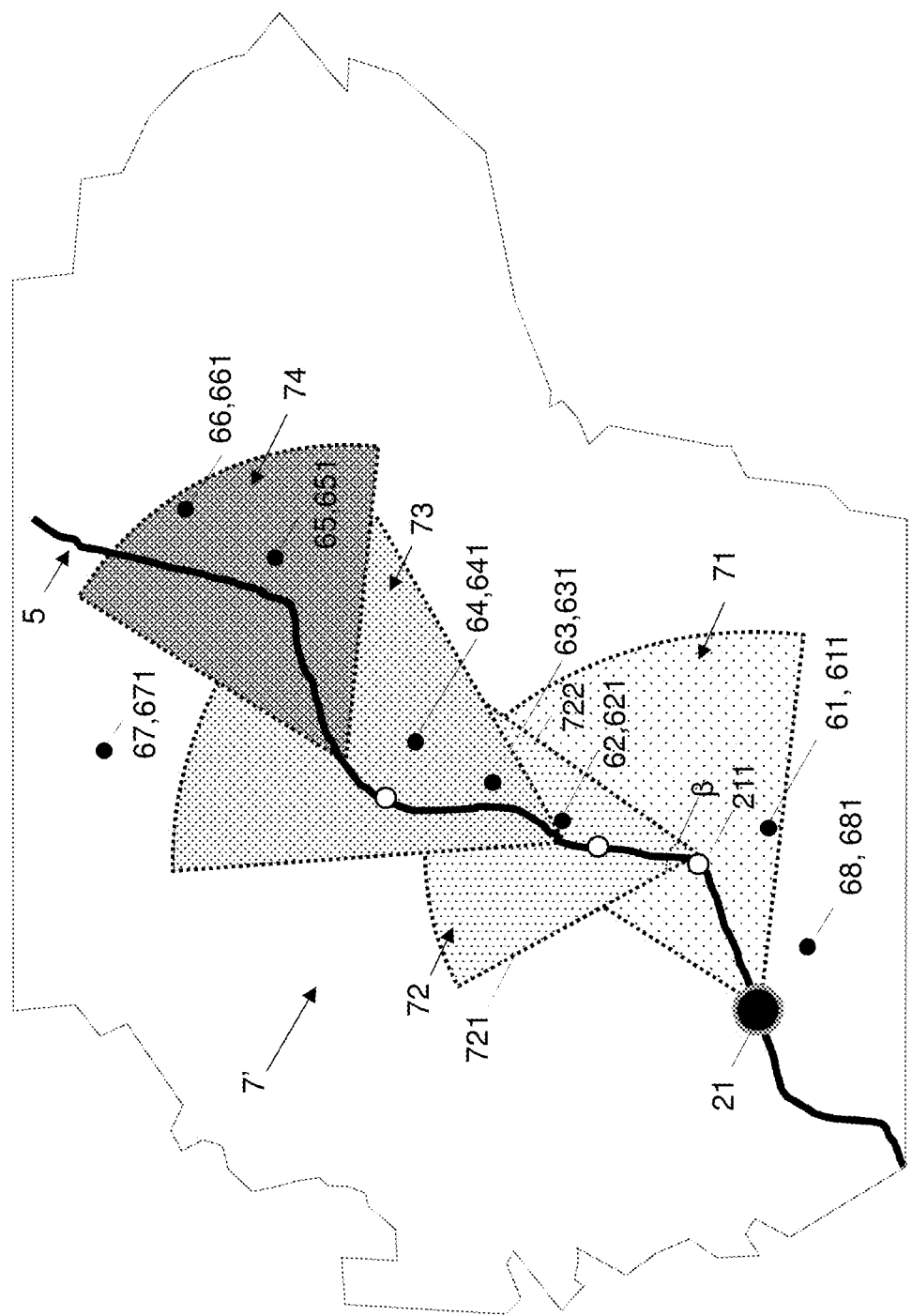
FIG. 4 illustrates a schematic overview of an exemplifying imaginary view of an alternative limiting zone according to embodiments of the disclosure.

FIG. 4 illustrates a schematic overview of an exemplifying imaginary view of an alternative limiting zone 7' comprising more than one sector according to embodiments of the disclosure, which may apply to the conditions of the embodiment shown of FIG. 1. Here, the imaginary view of the limiting zone 7'—in addition to the first sector 71—further comprises at least a second sector 72 extending in front of an estimated upcoming position 211 of the user device 2 further ahead along a road 5 along which the user device 2 is determined to move and/or a presumed upcoming road. The second sector 72 is enclosed by a third radius 721 and fourth radius 722 of a second circle, and has an angle β. The limiting zone 7' of the shown embodiment further comprises a third sector 73 and fourth sector 74, which respectively may have different radii and/or angles than the first sector 71 and/or the second sector 72. In the shown exemplifying embodiment—additionally to the first, second and third entities 61, 62, 63 having respective geographical locations within the limiting zone 7'—now also the fourth, fifth, and sixth entities 64, 65, 66 have respective 641, 651, 661 geographical locations falling within the liming zone 7', whereas the seventh and eighth entities 67, 68 have respective geographical locations 671, 681 still situated beyond the limiting zone 7'.

Figure 5:
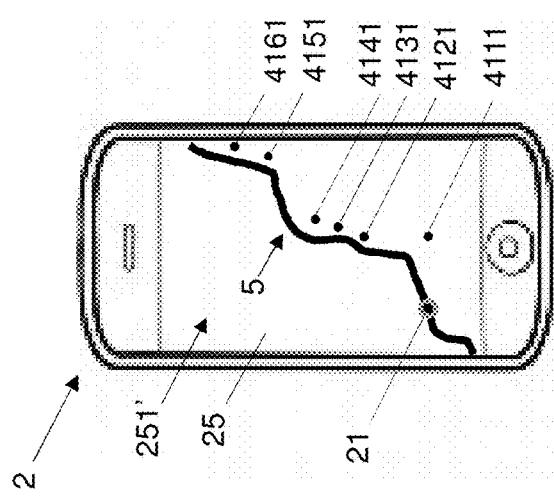
FIG. 5 illustrates a schematic overview of an exemplifying digital map view according to embodiments of the disclosure, which may result from applying the limiting zone of FIG. 4.

FIG. 5 illustrates a schematic overview of an exemplifying digital map view according to embodiments of the disclosure, which may result from applying the limiting zone 7'—subsequently the first, second, third and fourth sectors 71, 72, 73, 74—of FIG. 4. The digital map view illustrates a digital map 251' on the display 25 of the user device 2. Shown on the digital map 251' is the current vehicle position 21 on the exemplifying road 5 along which the vehicle 3—and subsequently the user device 2—is travelling. Enabled, here displayed, in the exemplifying embodiment, is thus—from implementing the limiting zone 7', i.e. the first, second, third and fourth sectors 71, 72, 73, 74—POI data of further entities 6. That is, now enabled, here displayed, is—in addition to the first, second and third POI data 4111, 4121, 4131—fourth POI data 4141 associated with the fourth entity 64, fifth POI data 4151 associated with the fifth entity 65, and sixth POI data 4161 associated with the sixth entity 66. It may be noted that POI data associated with respective seventh entity 67 and eighth entity 68 is not enabled/displayed.

FIG. 6 illustrates a schematic overview of the exemplifying data table 40 according to embodiments of the disclosure. The shown data table 40, or a similar arbitrarily arranged data table, matrix and/or set, may be arbitrarily stored in memory, for instance as previously discussed be comprised in the content selection system 1, the user device 2, the vehicle 3, the one or more servers 4, and/or one or more clouds, and/or be distributed between one or more of these. The data table 40 may hold information and/or posts on entities 6, and/or mapped entities corresponding to the physical entities 6. Moreover, the data table 40 may hold information and/or posts on locations 601 of entities 6, or mapped locations corresponding to and/or representing physical locations 601. Although not shown in FIG. 6, the exemplifying data table 40 may furthermore hold additional information associated with entities 6, such as further characteristics and/or attributes thereof. The data table 40 exemplifies how digital content 41 may be associated with respective entity 6, and furthermore how geographical locations 601 may be associated with respective entity 6. Shown in data table 40 is thus how the first location 611, the first POI data 4111 and/or the first piece of media content 4112—or pointers thereto—may be associated with the first entity 61. Similarly shown is further how the second location 621, the second POI data 4121 and/or the second piece of media content 4122—or pointers thereto—may be associated with the second entity 62, etc.

Figure 7:
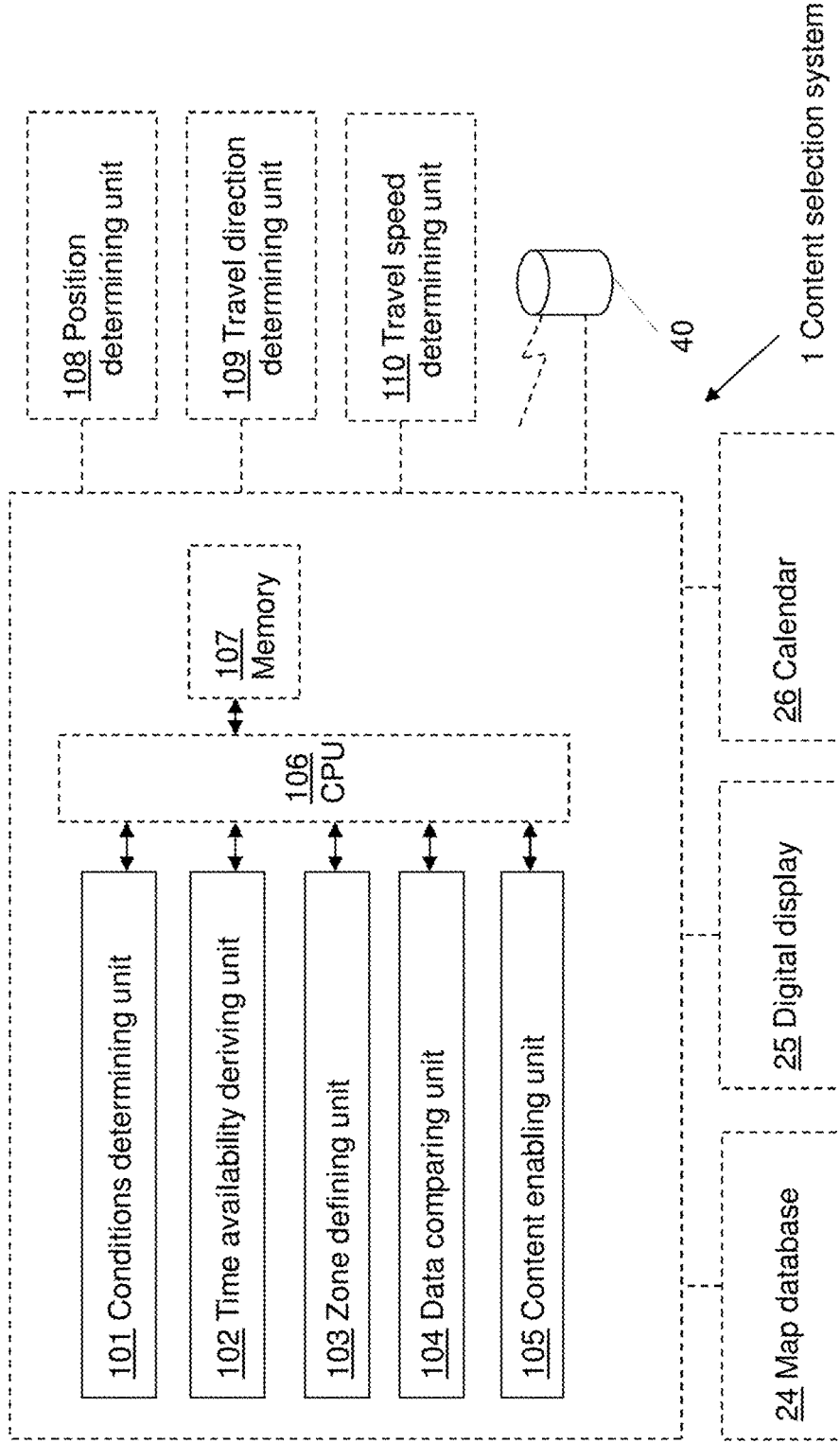
FIG. 7 illustrates a schematic block diagram illustrating an exemplifying content selection system according to embodiments of the disclosure.

As further shown in FIG. 7, which depicts a schematic block diagram illustrating an exemplifying content selection system 1 according to embodiments of the disclosure, the content selection system 1 is, as previously mentioned in conjunction with FIG. 1, adapted for selectively enabling a user device 2 on the move to utilize digital content 41 associated with one or more entities 6 located ahead of the user device 2. The content selection system 1 comprises a conditions determining unit 101, a time availability deriving unit 102, a zone defining unit 103, a data comparing unit 104 and a content enabling unit 105, all of which will be described in further detail below.

Furthermore, the embodiments herein for selectively enabling a user device 2 on the move to utilize digital content 41 associated with one or more entities 6 located ahead of the user device 2, may be implemented through one or more processors, such as a processor 106, here denoted CPU, together with computer program code for performing the functions and actions of the embodiments herein. Said program code may also be provided as a computer program product, for instance in the form of a data carrier carrying computer program code for performing the embodiments herein when being loaded into the content selection system 1. One such carrier may be in the form of a CD ROM disc. It is however feasible with other data carriers such as a memory stick. The computer program code may furthermore be provided as pure program code on a server and downloaded to the content selection system 1. The content selection system 1 may further comprise a memory 107 comprising one or more memory units. The memory 107 may be arranged to be used to store e.g. information, and further to store data, configurations, schedulings, and applications, and for instance data relating to entities 6, their respective locations 601, digital content 41 of said entities 6 and/or map data, to perform the methods herein when being executed in the content selection system 1.

Furthermore, the conditions determining unit 101, the time availability deriving unit 102, the zone defining unit 103, the data comparing unit 104, the content enabling unit 105, the optional processor 106, and/or the optional memory 107, may for instance be implemented in the user device 2, in one or more nodes e.g. engine or electrical control units (ECUs) of the vehicle 3, in the one or more servers 4, and/or in one or more clouds, and/or be distributed among one or more thereof. A potential distribution may be arbitrarily selected as considered suitable.

According to an alternative example, the content selection system 1 may be represented by a plug-in solution, such that said content selection system 1 at least partly is implemented on for instance a dongle. In that manner, an aftermarket solution may be provided to any arbitrary user device 1 and/or vehicle 2 suitable. Those skilled in the art will also appreciate that the conditions determining unit 101, the time availability deriving unit 102, the zone defining unit 103, the data comparing unit 104 and/or the content enabling unit 105, may refer to a combination of analog and digital circuits, and/or one or more processors configured with software and/or firmware, e.g. stored in a memory such as the memory 107, that when executed by the one or more processors such as the processor 106 perform as will be described in more detail below. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

Further illustrated in FIG. 7 is an exemplifying optional position determining unit 108 adapted to determine, store and/or provide a current position of the user device 2, an optional travel direction determining unit 109 adapted to determine, store and/or provide a current travel direction 22 of the user device 2, and an optional travel speed determining unit 110 adapted to determine, store and/or provide a current travel speed of the user device 2. The position determining unit 108, the travel direction determining unit 109 and/or the travel speed determining unit 110 may respectively be comprised in for instance the user device 2 and/or the vehicle 3, and further be adapted to communicate directly—or indirectly—with the content selection system 1. Further shown is the data table 40, and a map database 24 comprising map data, which map database 24 may be comprised in the content selection system 1, the user device 2, the vehicle 3, the one or more servers 4, and/or in one or more clouds. Additionally is the digital display 25 of the user device 2 illustrated, as well as a calendar 26 associated with the user device 2.

Figure 8:
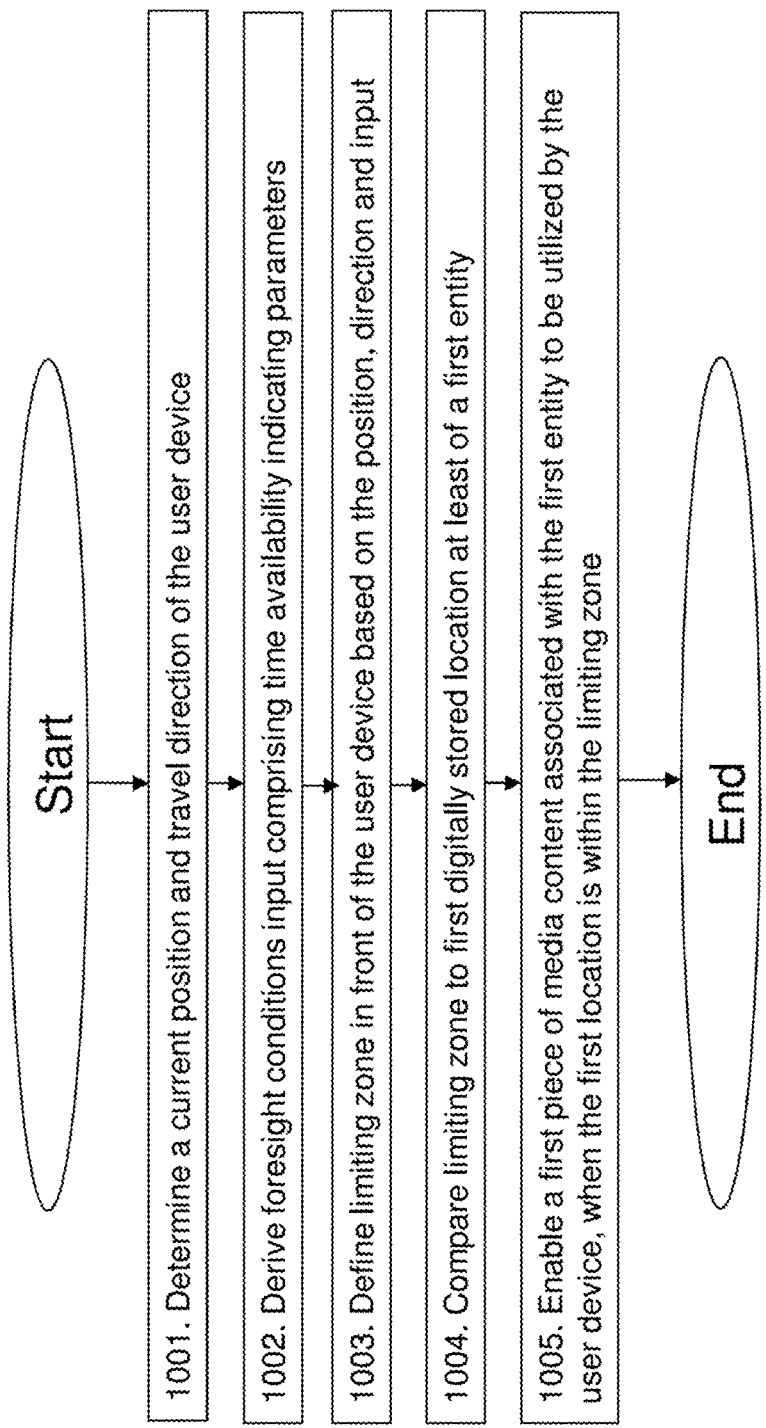
FIG. 8 is a flowchart depicting an exemplifying method performed by a content selection system according to embodiments of the disclosure.

FIG. 8 is a flowchart depicting an exemplifying method performed by a content selection system 1 according to embodiments of the disclosure. The content selection system 1 is for selectively enabling a user device 2 on the move to utilize digital content 41 associated with one or more entities 6 located ahead of the user device 2. The exemplifying method, which may be continuously repeated, comprises the following actions discussed with support from FIGS. 1-7. The actions may be taken in any suitable order, and/or one or more actions may even be performed simultaneously where applicable. For instance, Actions 1001 and 1002 may be performed essentially simultaneously, and/or in an alternative order.

Action 1001

In Action 1001, the content selection system 1 determines the current position 21 and the current travel direction 22 of the user device 2. Correspondingly, the conditions determining unit 101 is adapted for determining the current position 21 and the current travel direction 22 of the user device 2. Thereby, a prevailing estimated location 21 of the user device 2 is established, as well as a prevailing estimated direction 22 of travel thereof. The current user device position 21 may for instance be derived from the position determining unit 108, whereas the current travel direction 22 for instance may be derived from the travel direction determining unit 109.

Action 1002

In Action 1002, the content selection system 1 derives foresight conditions input comprising one or more time availability indicating parameters. Correspondingly, the time availability deriving unit 102 is adapted for deriving foresight conditions input comprising one or more time availability indicating parameters. Thereby, conditions indicating availability of time and/or foresight is obtained.

Optionally, the one or more time availability indicating parameters may comprise a current travel speed of the user device 2, which travel speed for instance may be derived from the travel speed determining unit 110. Additionally or alternatively, the one or more time availability indicating parameters may comprise a speed limit of a road 5 along which the user device 2 is determined to move and/or a presumed upcoming road, which speed limit for instance may be derived from the map data of the map data base 24. Additionally or alternatively, the one or more time availability indicating parameters may comprise an estimated time to a specified destination 51 for the user device 2, which estimated time for instance may be derived from a navigation system of the user device 2 and/or vehicle 3.

Additionally or alternatively, the one or more time availability indicating parameters may comprise a restricting time pertinent an upcoming planned activity specified in the calendar 26 associated with the user device 2, which restricting time for instance may be derived from said calendar 26. Additionally or alternatively, the one or more time availability indicating parameters may comprise a type of carrier 3 on which the user device 2 is carried; here a vehicle.

Action 1003

In Action 1003, the content selection system 1 defines the geographical limiting zone 7, 7' extending in front of the user device 2, based on the position 21, the travel direction 22, and at least a first time availability indicating parameter of the foresight conditions input. Correspondingly, the zone defining unit 103 is adapted for defining the geographical limiting zone 7, 7' extending in front of the user device 2, based on the position 21, the travel direction 22, and at least a first time availability indicating parameter of the foresight conditions input. Thereby, an imaginary restricting area extending ahead of the user device 2 is calculated in view of the position 21 and travel direction 22 of the user device 2 and one or more parameters of the foresight conditions input, for instance the current vehicle speed.

Optionally, the limiting zone 7 may be defined such that the imaginary plotted view thereof is represented by the sector 71 extending in front of the user device 2 enclosed by the first radius 711 and the second radius 712 of a circle, wherein the angle α of the sector 71 and/or a length of the radii 711, 712 is based on the at least first time availability indicating parameter. Thereby, the limiting zone 7 is represented by a fictive circle sector 71 restricted by the determined position 21 and travel direction 22 of the user device 2 as well as one or more time availability indicating parameters, for instance the current vehicle speed.

Furthermore, optionally, the limiting zone 7 may be defined such that the sector 71 is symmetrically arranged along the elongation of a fictive line 23 in the travel direction 22. Thereby, the travel direction 22 of the user device 2 dictates the direction of the sector 71, i.e. said travel direction 22 dictates the direction of the limiting zone 7, in that the sector 71 and subsequently the limiting zone 7 is symmetrically arranged along a hypothetical line 23 extending in the travel direction 22. Additionally or alternatively, the limiting zone 7 may be defined such that the sector 71 is symmetrically arranged along a section of the road 5 along which the user device 2 is determined to move. Thereby, the direction of the road section along which the user device 2 is moving dictates the direction of the sector 71, i.e. said direction of the road section dictates the direction of the limiting zone 7.

Moreover, optionally, the limiting zone 7' may be defined such that the imaginary view thereof further comprises at least the second sector 72 extending in front of the estimated upcoming position 211 of the user device 2 further ahead along the road 5 along which the user device 2 is determined to move and/or a presumed upcoming road. The second sector 72 is enclosed by the third and fourth radius 721, 722 of a second circle. The angle β of the second sector 72 and/or a length of the radii 721, 722 is based on the first time availability indicating parameter and/or on at least a second time availability indicating parameter of the foresight conditions input. Thereby, further entities 6—here the fourth, fifth and sixth entities 64, 65, 66—have respective geographical locations 641, 651, 661 falling within the limiting zone 7', since the fourth entity 64 has a location 641 falling within the third sector 73, and the fifth and sixth sectors 65, 66 have respective locations 651, 661 falling within the fourth sector 74. For instance, the angle α and/or radii 711, 712 of the first sector 71 may be based at least on the current speed of the user device 2, whereas the angle β and/or radii 721, 722 of the second sector 72 for instance may be based at least on the speed limit valid for an upcoming road 5 along which the estimated upcoming position 211 of the user device 2 is presumed to be situated.

Action 1004

In Action 1004, the content limiting system 1 compares the limiting zone 7, 7' to the first digitally stored geographical location 611 of at least the first entity 61. Correspondingly, the data comparing unit 104 is adapted for comparing the limiting zone 7, 7' to the first digitally stored geographical location 611 of at least the first entity 61. Thereby, the respective locations 601 of one or more entities 6 are considered in view of the determined limiting zone 7, 7'.

Action 1005

In Action 1005, the content selection system 1 enables the first piece of digital content 411 associated with the first entity 61 to be utilized by the user device 2, when the first location 611 is within the limiting zone 7, 7'. Correspondingly, the content enabling unit 105 is adapted for enabling the first piece of digital content 411 associated with the first entity 61 to be utilized by the user device 2, when the first location 611 is within the limiting zone 7, 7'. Thereby, digital content 411 of the first entity 61 is not made available to the user device 2 until the geographical location 611 of the first entity 61 is determined—by the previous comparing action 1004—to fall within the limiting zone 7, 7'. Accordingly, only digital content 41 of entities 6 determined to have—or to have had—respective geographical locations 601 within the limiting zone 7, 7', is enabled to be utilized—e.g. presented—by the user device 2. Thereby, a filter mechanism is introduced, according to which digital content 41 of entities 6 determined to have respective geographical locations 601 beyond the limiting zone 7, 7', is prevented from being utilized by the user device 2. Accordingly, rather than allowing digital content 41 of a potentially extensive amount of entities 6 to be made available to the user device 2, merely digital content 41 of a filtered amount of entities 6—which given the current circumstance—is enabled to be utilized by the user device 2. Consequently, the user device 2—and subsequently a user thereof, e.g. an occupant of the vehicle 3 on-board which the user device is carried—may be prevented from utilizing, e.g. being presented, digital content 41 associated with potentially irrelevant entities 6 given the current circumstances, i.e. given the one or more time availability indicating parameters such as e.g. the vehicle speed.

Thus, in view of the exemplifying limiting zone 7 presented in FIG. 2, only the first piece of digital content 411, the second piece of digital content 412 and the third piece of digital content 413, of respective first, second and third entities 61, 62, 63 determined to have respective geographical locations 611, 621, 631 within the limiting zone 7, are enabled to be utilized by the user device 2. Correspondingly, in view of the exemplifying limiting zone 7' presented in FIG. 4, additionally the fourth, fifth and sixth piece of digital content 414, 415, 416, of respective fourth, fifth and sixth entities 64, 65, 66 additionally determined to have respective geographical locations 641, 651, 661 within the limiting zone 7', are further enabled to be utilized by the user device 2.

Optionally, the digital content 41 may comprise media content and the first piece of digital content 411 comprise the first piece of media content 4112 associated with the first entity 61. Thereby, media content of one or more entities 6 may be enabled to be utilized by the user device 2, when geographical locations 601 of said entities 6 are within the limiting zone 7, 7'. Accordingly, media content—such as e.g. curiosa, information and/or facts in audio, text, video, URL etc. format—associated with those entities 6 located within the limiting zone 7, 7', may be made available for use by the user device 2, for instance for audible and/or visual presentation thereof. Thus, in the scenario of the first entity 61 being represented by the exemplifying tourist attraction, and the first piece of media content 4112 represented by parking guidance for parking in the vicinity of said tourist attraction 61, then said parking guidance 4112 would be enabled for utilization—e.g. presentation—by the user device 2, when the geographical location 611 of the tourist attraction 61 falls within the limiting zone 7, 7'.

Additionally or alternatively, the digital content 41 may comprise POI data and the first piece of digital content 411 comprise first POI data 4111 associated with the first entity 61. Enabling the first piece of digital content 411 to be utilized by the user device 2, then comprises enabling—e.g. displaying—at least a portion of the first POI data 4111 on the digital map 251 on the display 25 of the user device 2, as shown in FIGS. 3 and 5. Correspondingly, the content enabling unit 105 is further adapted for enabling—e.g. displaying—at least a portion of the first POI data 4111 on the digital map 251 on the display 25 of the user device 2, as shown in FIGS. 3 and 5. Thereby, POI data of one or more entities 6 may be enabled to be e.g. displayed by the user device 2, when respective geographical locations 601 of said entities 6 are within the limiting zone 7, 7'. Thus, in view of the exemplifying limiting zone 7 presented in FIG. 2, the first, second and third POI data 4111, 4121, 4131, of the respective first, second and third entities 61, 62, 63, may be e.g. displayed by the user device 2 as shown in FIG. 3, when the respective locations 611, 621, 631 of said entities 61, 62, 63 are within the limiting zone 7. Correspondingly, in view of the exemplifying limiting zone 7' presented in FIG. 4, additionally the fourth, fifth and sixth POI data 4141, 4151, 4161, of the respective fourth, fifth and sixth entities 64, 65, 66, may additionally be e.g. displayed by the user device 2 as shown in FIG. 5, when the respective locations 641, 651, 661 of said entities 64, 65, 66 additionally are within the limiting zone 7'. In the scenario of the first entity 61 being represented by the exemplifying tourist attraction, and the first POI data 4111 comprising at least a POI icon, then said POI icon 4111 would be enabled for display by the user device 2, when the geographical location 611 of the tourist attraction 61 falls within the limiting zone 7, 7'.

The person skilled in the art realizes that the present disclosure by no means is limited to the preferred embodiments described above. On the contrary, many modifications and variations are possible within the scope of the appended claims. It should furthermore be noted that the drawings are not necessarily to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. A method of accessing digital content comprising:
   determining a current position and a current travel direction of a user device;
   deriving foresight conditions comprising one or more time availability indicating parameters, wherein the one or more time availability indicating parameters include:
   a current travel speed of the user device,
   a speed limit of the road along which the user device is moving or a presumed upcoming road;
   an estimated time to a specified destination for the user device;
   a restricting time associated with an upcoming planned activity specified in a calendar associated with the user device; or
   a type of carrier on which the user device is carried;
   defining a limiting zone extending in front of said user device based on said current position, said current travel direction, and at least a first time availability indicating parameter of said foresight conditions, wherein the limiting zone is arranged along a section of a road along which the user device is moving, wherein the limiting zone is further defined such that an imaginary plotted view of the limiting zone is represented by a sector extending in front of the user device enclosed by a first radius and a second radius of a circle, wherein an angle ($\alpha$) of the sector or a length of the first radius or the second radius is based on the at least first time availability indicating parameter, wherein the limiting zone is further defined such that the sector is symmetrically or asymmetrically arranged along the section of the road along which the user device is moving or along the presumed upcoming road, and wherein the limiting zone is defined such that the imaginary plotted view of the limiting zone further comprises at least a second sector extending in front of an estimated upcoming position of the user device further ahead along the road along which the user device is moving or the presumed upcoming road, the second sector being enclosed by a third radius and a fourth radius of a second circle, wherein an angle ($\beta$) of the second sector or a length of the third radius or the fourth radius is based on the first time availability indicating parameter or on at least a second time availability indicating parameter of the foresight conditions;

comparing said limiting zone to a first location of at least a first entity of one or more entities located ahead of the user device along the road; and presenting a first piece of digital content associated with said first entity when said first location is within said limiting zone.

2. The method according to claim 1, wherein said digital content comprises media content and said first piece of digital content comprises a first piece of media content associated with said first entity.

3. The method according to claim 1, wherein said digital content comprises Point of Interest (POI) data and said first piece of digital content comprises first POI data associated with said first entity, and wherein presenting said first piece of digital content comprises presenting at least a portion of said first POI data on a digital map on a display of said user device.

4. A content selection system for accessing digital content comprising:

a conditions determining unit adapted for determining a current position and a current travel direction of a user device;

a time availability deriving unit adapted for deriving foresight conditions comprising one or more time availability indicating parameters, wherein the one or more time availability indicating parameters comprise:

a current travel speed of the user device;

a speed limit of the road along which the user device is moving or a speed limit of a presumed upcoming road;

an estimated time to a specified destination for the user device;

a restricting time associated with an upcoming planned activity specified in a calendar associated with the user device; or a type of carrier on which the user device is carried;

a zone defining unit adapted for defining a limiting zone extending in front of said user device, based on said current position, said current travel direction, and at least a first time availability indicating parameter of said foresight conditions, wherein the limiting zone is arranged along a section of a road along which the user device is moving, wherein the limiting zone is further defined such that an imaginary plotted view of the limiting zone is represented by a sector extending in front of the user device enclosed by a first radius and a second radius of a circle, wherein an angle ($\alpha$) of the sector or a length of the first radius or second radius is based on the at least first time availability indicating parameter, wherein the limiting zone is further defined such that the sector is symmetrically or asymmetrically arranged along the section of the road along which the user device is moving or the presumed upcoming road, and wherein the limiting zone is defined such that the imaginary plotted view of the limiting zone further comprises at least a second sector extending in front of an estimated upcoming position of the user device further ahead along the road along which the user device is moving or the presumed upcoming road, the second sector being enclosed by a third radius and a fourth radius of a second circle, wherein an angle ($\beta$) of the second sector or a length of the third radius or the fourth radius is based on the first time availability indicating parameter or on at least a second time availability indicating parameter of the foresight conditions;

a data comparing unit adapted for comparing said limiting zone to a first location of at least a first entity of one or more entities located ahead of the user device along the road; and a content enabling unit adapted for presenting a first piece of digital content associated with said first entity on said user device when said first location is within said limiting zone.

5. The content selection system according to claim 4, wherein said digital content comprises media content and said first piece of digital content comprises a first piece of media content associated with said first entity.

6. The content selection system according to claim 4, wherein said digital content comprises Point of Interest (POI) data, wherein said first piece of digital content comprises first POI data associated with said first entity, and wherein said content enabling unit further is adapted for presenting at least a portion of said first POI data on a digital map on a display of said user device.

7. A user device comprising at least a portion of a content selection system according to claim 4.

* * * * *